Dec. 6, 1960 F. G. SIEGEL 2,963,618

CATHODE-RAY-TUBE BEAM FINDER CIRCUIT

Filed Oct. 24, 1958

INVENTOR
FLOYD G. SIEGEL
BY [signature]
ATTORNEY 2,963,618

CATHODE-RAY-TUBE BEAM FINDER CIRCUIT

Floyd G. Siegel, Mountain View, Calif., assignor to Hewlett-Packard Company, Palo Alto, Calif., a corporation of California Filed Oct. 24, 1958, Ser. No. 769,369

5 Claims. (Cl. 315—24)

This invention relates to cathode ray oscilloscopes.

When deflection signals above a certain level are applied to a cathode ray tube the beam spot may be deflected off the face of the tube. Unless means are provided to indicate the direction in which the beam is overdeflected the operator does not know in which direction he should adjust his deflection controls in order to bring the beam back on the face of the tube.

It is the principal object of this invention to provide a simple beam finder circuit which will indicate to the operator of an oscilloscope the direction in which the beam is deflected off the face of the cathode ray tube.

One way of obtaining this result would be to provide a control which would reduce momentarily the gain of the horizontal and vertical amplifiers so as to bring the beam back on the face of the tube. Unless precautions involving some expense were taken, this would cause a deterioration in the high-frequency performance of the oscilloscope due to the added capacitance of the necessary additional resistors and switches.

It is therefore another object of this invention to provide a beam finder circuit which will not affect the high-frequency performance of an oscilloscope.

Briefly, in accordance with the illustrated embodiment of this invention, this object is accomplished by providing push-button means to reduce the voltage between the two horizontal plates and between the two vertical plates to a level low enough for the beam spot to be brought back onto the face of the tube.

Figure 1:
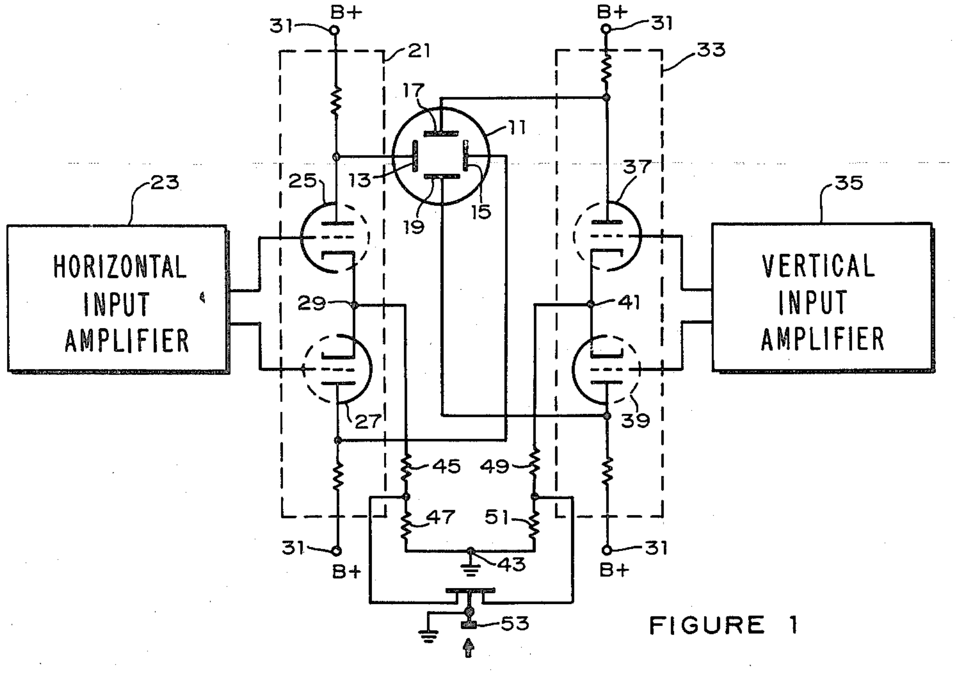
Figure 2:
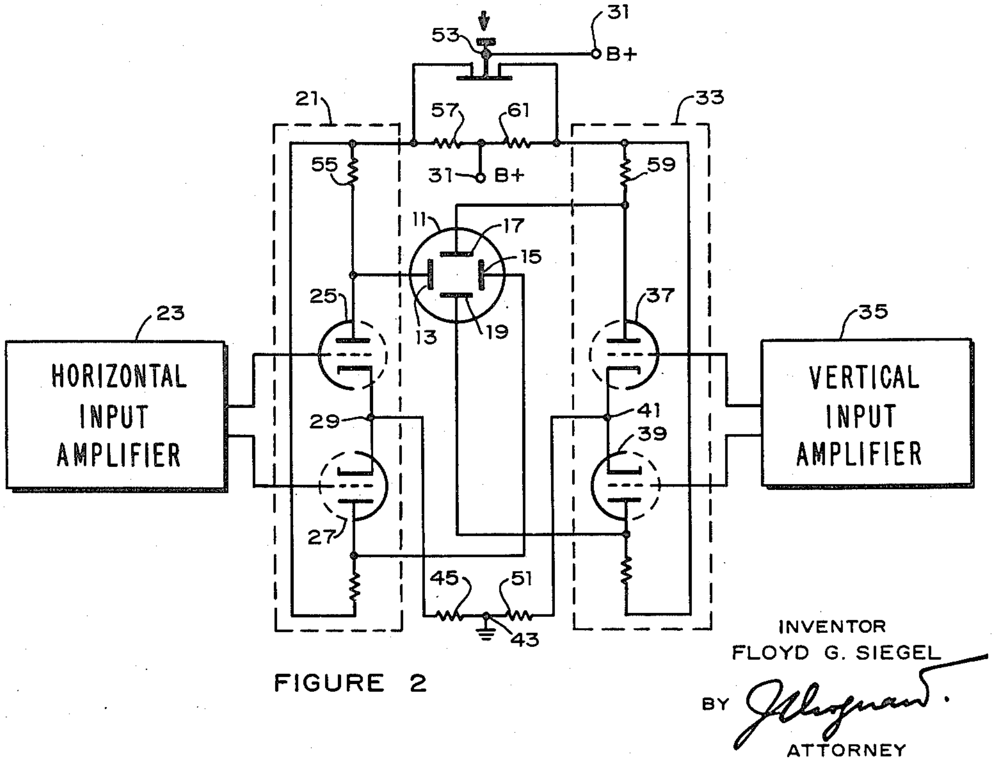

Other and incidental objects of this invention will be apparent to those skilled in the art from a reading of this specification and an inspection of the accompanying drawing in which:

Figure 1 shows an embodiment of this invention in which the voltage between the plates is limited by momentarily introducing an additional resistor in the cathode circuit of each of the horizontal and vertical output amplifiers thus limiting the total current through these amplifiers; and Figure 2 shows another embodiment of this invention in which the voltage between the plates is limited by momentarily introducing an additional resistor in the plate circuit of each of the horizontal and vertical output amplifiers thus limiting the apparent supply voltage for these amplifiers.

Referring now to Figure 1 there is shown a cathode ray tube 11 having horizontal deflection plates 13 and 15 and vertical deflection plates 17 and 19. The horizontal deflection plates 13 and 15 are connected to a horizontal output amplifier 21 which obtains its signal from a horizontal input amplifier 23. The horizontal output amplifier 21 comprises two vacuum tube sections 25 and 27 the cathodes of which are tied together at junction point 29 and the anodes of which are connected through load resistors to the positive power supply terminal 31. Similarly, the vertical deflection plates 17 and 19 are driven by a vertical output amplifier 33 which obtains its signal from a vertical input amplifier 35. The vertical output amplifier 33 comprises two tube sections 37 and 39 the cathodes of which are tied together at junction point 41 and the anodes of which are connected through resistors to the positive power supply terminal 31.

In accordance with the illustrated embodiment of this invention the junction point 29 of the cathodes of the horizontal output amplifier 21 and the junction point 41 of the cathodes of the vertical output amplifier 33 are each connected to the negative power supply terminal 43 through pairs of series connected resistors 45, 47 and 49, 51. The resistors 47 and 51 are normally shunted by means of a push-button beam finder switch 53.

The operation of the beam finder circuit shown in Figure 1 is as follows: the push-button beam finder switch 53 is normally closed so that the only resistor in the cathode circuit of the horizontal output amplifier 21 is resistor 45 and the only resistor in the cathode circuit of the vertical output amplifier 33 is resistor 49. When the push-button beam finder switch is actuated the additional resistors 47 and 51 are placed in series with the cathode resistors 45 and 49 respectively. This limits the current in the cathode circuit of the amplifiers 21 and 33, and therefore limits the voltage across the horizontal and vertical deflection plates of the cathode ray tube 11. By choosing the proper values of resistances these voltages may be limited sufficiently to bring the beam spot back onto the face of the tube. If the beam is over-deflected upwards and to the right, actuation of the beam finder push-button switch 53 will bring the beam spot back onto the upper right hand quadrant of the cathode ray tube face. The operator will then know how to adjust his controls to have the beam spot on the face of the tube under normal operating conditions.

Reference is now made to Figure 2 in which the reference numerals used in Figure 1 have been preserved to show similar parts. Here the cathode junctions 29 and 41 are connected to the negative power supply terminal 43 through cathode resistors 45 and 51. The anode of tube section 25 is connected to the positive power supply terminal 31 through series connected resistors 55 and 57 while the anode of the tube section 37 is connected to the power supply terminal 31 through series connected resistors 59 and 61. The resistors 57 and 61 are shunted by beam finder push-button switch 53.

The operation of the embodiment of the invention shown in Figure 2 is as follows: under normal operating conditions the resistors 57 and 61 are shunted by the beam finder push-button switch 53. When the beam finder push-button switch 53 is actuated these two resistors 57 and 61 are inserted in series with the load resistors 55 and 59. This has the effect of reducing the apparent voltage supply across the amplifiers 21 and 23. This also reduces the deflection voltage across the horizontal and vertical plates and brings the beam back onto the face of the tube.

I claim:

1. In a cathode ray oscilloscope, a cathode ray tube having a pair of horizontal deflection plates and a pair of vertical deflection plates, means to supply a voltage across said horizontal deflection plates, means to supply a voltage across said vertical deflection plates, and beam-finder switching means to reduce momentarily and simultaneously the steady voltages across each pair of said deflection plates.

2. In a cathode ray oscilloscope, a cathode ray tube having a pair of horizontal deflection plates and a pair of vertical deflection plates, a horizontal amplifier connected to said horizontal deflection plates, a vertical amplifier connected to said vertical deflection plates, means to connect said horizontal and vertical amplifiers across power supply terminals, and push-button beam-finder switching means to connect momentarily and simultaneously an additional resistance in series with each of said amplifiers and said power supply terminals.

3. In a cathode ray oscilloscope, a cathode ray tube having a pair of horizontal deflection plates and a pair of vertical deflection plates, a horizontal amplifier having anode and cathode circuits, means to connect the output of said horizontal amplifier to the horizontal deflection plates, a vertical amplifier having anode and cathode circuits, means to connect the output of said vertical amplifier to said vertical deflection plates, and beam-finder switching means to connect momentarily an additional series resistance in the cathode circuit of each of said amplifiers.

4. In a cathode ray oscilloscope, a cathode ray tube having a pair of horizontal deflection plates and a pair of vertical deflection plates, a horizontal amplifier having anode and cathode circuits, means to connect the output of said horizontal amplifier to the horizontal deflection plates, a vertical amplifier having anode and cathode circuits, means to connect the output of said vertical amplifier to said vertical deflection plates, and beam-finder switching means to connect momentarily an additional series resistance in the anode circuit of each of said amplifiers.

5. In a cathode ray oscilloscope, a cathode ray tube having a pair of horizontal deflection plates and a pair of vertical deflection plates, a horizontal amplifier having anode and cathode circuits, means to connect the output of said horizontal amplifier to the horizontal deflection plates, a vertical amplifier having anode and cathode circuits, means to connect the output of said vertical amplifier to said vertical deflection plates, and beam-finder switching means to connect momentarily and simultaneously an additional series resistance in the cathode circuit of each of said amplifiers.

References Cited in the file of this patent

UNITED STATES PATENTS

| | | |
|---|---|---|
| 1,978,684 | McCreary | Oct. 30, 1934 |
| 2,093,395 | Ballard | Sept. 14, 1937 |
| 2,153,140 | Diehl | Apr. 4, 1939 |
| 2,426,439 | Dome | Aug. 26, 1947 |
| 2,455,283 | Valley | Nov. 30, 1948 |
| 2,646,530 | Goodell | July 21, 1953 |
| 2,717,330 | Meagher | Sept. 6, 1955 |
| 2,786,961 | Forbes | Mar. 26, 1957 |